UNITED STATES PATENT OFFICE.

ALVIN S. WHEELER, OF CHAPEL HILL, NORTH CAROLINA.

DYESTUFFS AND PROCESS OF MAKING SAME.

1,327,260.   Specification of Letters Patent.   Patented Jan. 6, 1920.

No Drawing.   Application filed December 9, 1918.   Serial No. 265,988.

*To all whom it may concern:*

Be it known that I, ALVIN S. WHEELER, a citizen of the United States, residing at Chapel Hill, in the county of Orange and State of North Carolina, have invented certain new and useful Improvements in Dyestuffs and Process of Making Same, of which the following is a specification.

By the halogenation of juglon (5-hydroxy-α-naphthoquinone) and other mono- and dihydroxynaphthoquinones there are obtained halogen substitution products which are phenolic in character and which dissolve in alkalis forming new and valuable dyestuffs.

The following examples illustrate the invention:—

Example I: Three to four parts by weight of bromin are added to a solution of one part by weight of juglon in 15-20 parts by weight of glacial acetic acid. The dark red solution is heated by steam heat for two or three hours and then allowed to cool. A dense mass of red needle-like crystals separate from the solution. The dried crystals weigh about twice as much as the juglon taken and their composition corresponds to the formula

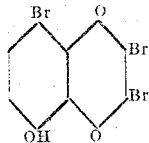

On grinding, the crystals form a brick-red powder. The melting point of this 2, 3, 8 tribrom-5-hydroxynaphthoquinone is about 170° C. It is insoluble in water but may be recrystallized from hot glacial acetic acid and may also be purified by dissolving in chloroform and precipitating with additions of light petroleum distillates.

The sodium salt of the above tribrom compound may be made by dissolving the compound in ether and shaking this solution with an aqueous solution of two parts by weight of anhydrous sodium carbonate. A purplish deposit having the formula $C_{10}H_2O_3Br_3Na$ quickly separates out. The sodium salt is soluble in water and acts as a powerful dye. Silk is dyed directly a beautiful champagne color which may be modified by the use of mordants. Wool is also dyed directly in shades of tan. Cotton is not dyed directly but when mordanted with tannic acid, a light ecru is obtained.

Example II: An excess of chlorin is passed into a solution of juglon in ten parts by weight of glacial acetic acid. After heating by steam heat for three hours, the solution is cooled and the chlorinated product is obtained in the form of golden brown crystals which substantially correspond to the formula

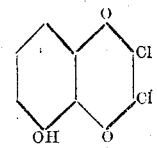

This compound, dichlorojuglon, has the formula $C_{10}H_4O_3Cl_2$ and melts at about 149° C. It is insoluble in water but soluble in alcohol, from which it may be recrystallized. The chlorinated product is also soluble in alkalis forming a dyestuff similar in properties to that obtained by bromination.

Dyestuffs made in accordance with my invention exhibit excellent fastness toward light and laundrying. While in the foregoing examples, acetic acid is mentioned as the solvent, sodium carbonate the alkali, and bromin and chlorin as the halogens, it is to be understood that the invention is not limited to the use of these agents but other solvents, alkalis, and halogens may be employed, and that where these elements are specifically mentioned, it is for the purpose of illustration, and the invention is therefore claimed within the legitimate and valid scope of the appended claims.

Having thus described my invention, I claim:

1. The process of preparing dyestuffs which comprises dissolving a hydroxynaphthoquinone having less than three hydroxyl groups in a solvent, treating the solution with a halogen in excess, separating the halogenated product, and forming a salt thereof, substantially as described.

2. The process of preparing dyestuffs which comprises dissolving juglon in hot glacial acetic acid, treating the solution with an excess of bromin, cooling the solution to separate the dye-base, and forming a salt of the dye-base, substantially as described.

3. As new dyestuffs the products resulting from the action of halogens in excess on dissolved hydroxynaphthoquinones having less than three hydroxyl groups, said products being insoluble in water but soluble in alkalis forming salts which act as powerful dyestuffs, dyeing wool and silk directly in fast shades of tan.

4. As a new dyestuff tribromojuglon, forming red crystals, soluble in hot glacial acetic acid, chloroform, or alkalis insoluble in water, melting at about 170° C., and forming salts which dye wool directly in shades of tan said tribromojuglon having the formula

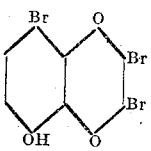

substantially as described.

5. As a new dyestuff, the precipitated product of bromin and juglon corresponding substantially to the formula

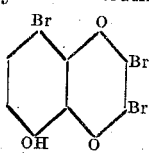

6. As a new dyestuff, the deposit effected by dissolving in ether in the presence of an alkali the crystalline product resulting from the halogenation of a hydroxynaphthoquinone.

7. As a new dyestuff, the halogen substitution products of phenolic character and dissolvable in alkalis resulting from the halogenation of hydroxynaphthoquinones.

8. The process of preparing dyestuffs, comprising adding bromin to a solution of juglon, dissolving the resulting crystalline product in ether and adding sodium carbonate to produce a deposit substantially agreeing to the formula $C_{10}H_2O_3Br_3Na$.

9. The process of preparing dyestuffs comprising adding bromin to a solution of juglon, dissolving the resulting crystalline product in ether, adding sodium carbonate and treating the resulting product with tannic acid.

10. The process of preparing dyestuffs comprising dissolving a hydroxynaphthoquinone in acetic acid, treating the solution with a halogen, heating and subsequently cooling the solution to separate the dye base, and forming a salt thereof.

11. The process of preparing dyestuffs comprising dissolving a hydroxynaphthoquinone in a solvent, treating the solution with a halogen, and separating the halogenated product for use as a dye base, substantially as specified.

12. The process of preparing dyestuffs comprising dissolving a hydroxynaphthoquinone in a solvent, treating the solution with a halogen, separating the halogenated product, and dissolving the separated halogenated product in the presence of an alkali, substantially as specified.

13. The process of preparing dyestuffs, comprising dissolving a hydroxynaphthoquinone in a solvent, treating the solution with a halogen, separating the halogenated product, and associating a solution of the separated product with a mordant of tannic acid, substantially as specified.

In testimony whereof, I have hereunto set my hand this 3d day of December A. D. 1918.

ALVIN S. WHEELER.

Witnesses:
CHAS. T. WOOLLEN,
JAMES M. BELL.